United States Patent
Jensen et al.

(10) Patent No.: US 10,017,142 B2
(45) Date of Patent: Jul. 10, 2018

(54) FILTRATION OF ACOUSTIC CONTAMINATE FROM VEHICLE SAFETY SENSORS

(71) Applicant: Ford Global Technologies, LLC, Dearborn, MI (US)

(72) Inventors: John W. Jensen, Canton, MI (US); Mahmoud Yousef Ghannam, Canton, MI (US); Howard Churchwell, Monroe, MI (US); John Vincent Fazio, Dearborn, MI (US); Lirjon Llusho, Saint Clair Shores, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/263,350

(22) Filed: Sep. 12, 2016

(65) Prior Publication Data
US 2018/0072324 A1     Mar. 15, 2018

(51) Int. Cl.
*B60R 21/0132*     (2006.01)
*B60K 28/14*     (2006.01)
(Continued)

(52) U.S. Cl.
CPC .......... *B60R 21/0132* (2013.01); *B60K 28/14* (2013.01); *B60R 21/01336* (2014.12);
(Continued)

(58) Field of Classification Search
CPC .......... B60R 21/013; B60R 2021/0117; B60R 2021/01302; B60R 21/0132;
(Continued)

(56) References Cited

U.S. PATENT DOCUMENTS

| | | |
|---|---|---|
| 4,221,191 A | 9/1980 | Asano et al. |
| 5,208,484 A | 5/1993 | Okano et al. |

(Continued)

FOREIGN PATENT DOCUMENTS

| | | | | |
|---|---|---|---|---|
| CN | 101654089 A | 2/2010 | | |
| DE | 102004021648 A1 * | 12/2005 | ......... | B60R 21/0132 |

(Continued)

OTHER PUBLICATIONS

Instructions on Style for the Washington Administrative Code WAC 2009, 17 pages, downloaded from: http://www.dol.wa.gov/business/boards/docs/InstructionsOnStyle.pdf (Year: 2009).*

(Continued)

*Primary Examiner* — Behrang Badii
*Assistant Examiner* — David A Testardi
(74) *Attorney, Agent, or Firm* — James P. Muraff; Neal, Gerber & Eisenberg LLP

(57) ABSTRACT

A vehicle includes: an audio system, local sensors including a crash sensor, a fuel pump, and processor(s) configured to: (a) select filter(s) based on a determined audio system state; (b) decontaminate present crash sensor data via the filter(s); (c) determine whether to deactivate the fuel pump based on the decontaminated data. The processor(s) are configured to map prior crash sensor data to prior determined audio system states and select the filter(s) by selecting some of the mapped prior crash sensor data.

11 Claims, 9 Drawing Sheets

(51) Int. Cl.
*B60W 50/00* (2006.01)
*B60R 21/01* (2006.01)
*B60R 21/013* (2006.01)

(52) U.S. Cl.
CPC .. *B60W 50/0098* (2013.01); *B60R 2021/0117* (2013.01); *B60R 2021/01252* (2013.01); *B60R 2021/01302* (2013.01)

(58) Field of Classification Search
CPC .... B60R 21/01336; B60R 2021/01252; B60K 28/14; B60W 50/0098
See application file for complete search history.

(56) References Cited

U.S. PATENT DOCUMENTS

| | | |
|---|---|---|
| 5,251,469 A | 10/1993 | Chan |
| 5,337,260 A | 8/1994 | Spangler |
| 5,797,111 A * | 8/1998 | Halasz ................ B60K 15/01 701/103 |
| 6,081,758 A | 6/2000 | Parvulescu |
| 6,243,632 B1 * | 6/2001 | Jung ................ B60R 21/0132 180/268 |
| 6,640,174 B2 | 10/2003 | Schondorf et al. |
| 6,766,235 B2 | 7/2004 | Frimberger et al. |
| 7,055,640 B2 | 6/2006 | Cook |
| 7,278,657 B1 | 10/2007 | McCurdy |
| 7,529,606 B2 | 5/2009 | Tustanowski et al. |
| 2002/0103590 A1 * | 8/2002 | Schondorf ............ B60K 28/14 701/45 |
| 2005/0200105 A1 | 9/2005 | Mihara et al. |
| 2006/0027412 A1 | 2/2006 | Geborek |
| 2006/0137929 A1 | 6/2006 | Yoshida |
| 2010/0121525 A1 * | 5/2010 | Le ................ B60K 28/14 701/36 |
| 2015/0114081 A1 * | 4/2015 | Imoto ............ B60R 21/0136 73/1.57 |
| 2016/0362075 A1 * | 12/2016 | Dlagnekov ........ G01P 15/0891 |
| 2017/0197504 A1 * | 7/2017 | Jensen ............ B60K 15/077 |

FOREIGN PATENT DOCUMENTS

| | | | |
|---|---|---|---|
| DE | 102004021648 A1 | 12/2005 | |
| DE | 102008040558 A1 * | 1/2010 | ......... B60R 21/0134 |
| EP | 2075164 A1 | 12/2008 | |
| FR | 2909044 A1 | 5/2008 | |
| GB | 2547771 A | 8/2017 | |
| JP | 2003262648 A * | 9/2003 | ......... B60R 21/0132 |
| JP | 2007232566 A * | 9/2007 | |
| JP | 2007232566 A | 9/2007 | |
| JP | 2007237835 A | 9/2007 | |
| JP | 2009234427 A | 10/2009 | |
| JP | 2010177973 A * | 8/2010 | |
| JP | 2012052851 A * | 3/2012 | |
| JP | 2013051553 A * | 3/2013 | |
| KR | 19970036108 A | 7/1997 | |
| KR | 20030092281 A | 12/2003 | |

OTHER PUBLICATIONS

JPO machine translation of JP 2007-232566 (original JP document published Sep. 13, 2007) (Year: 2007).*
JPO machine translation of JP 2012-052851 (original JP document published Mar. 15, 2012) (Year: 2012).*
Noise Cancelling in audio signal with adaptive filter—Draghiciu Nicole, Reiz Romulus, University of Oradea (vol. 45), Nov. 6, 2004 (pp. 1-4).
New Methods for Adaptive Noise Suppression, https://www.researchgate.net/publication/232629444—May 1995 (pp. 1-5).
Noise Removal in Speech Processing Using Spectral Subtraction—http://www.scirp.org/journal/jsip, http://dx.doi.org/10.4236/jsip.2014.52006 (pp. 1-10), (Year: 2014).
Search Report dated Jun. 20, 2017 for GB Patent Application No. GB1700396.3 (4 Pages).
Search Report dated Mar. 7, 2018 for GB Patent Application No. GB1714502.0 (4 Pages).

* cited by examiner

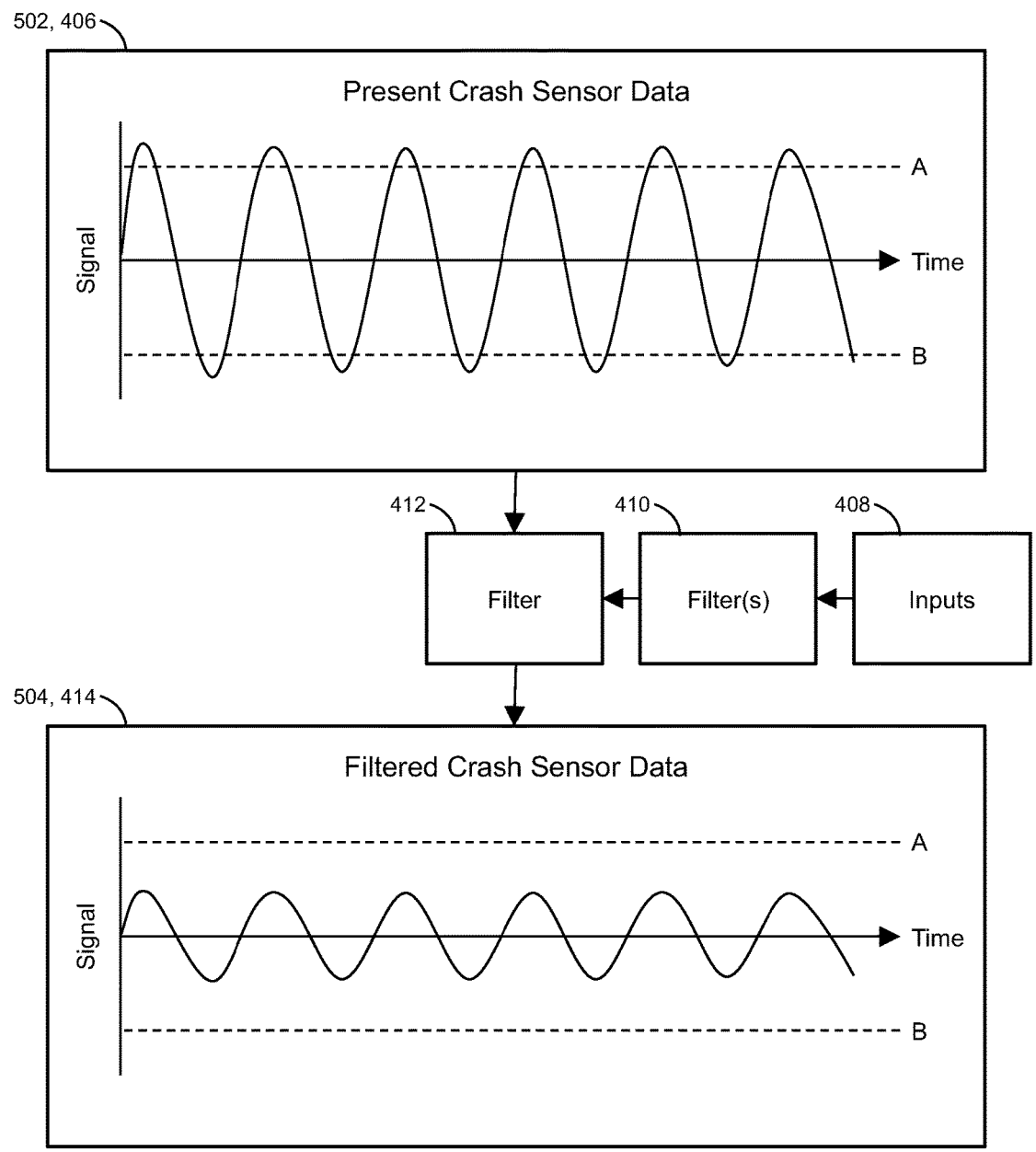

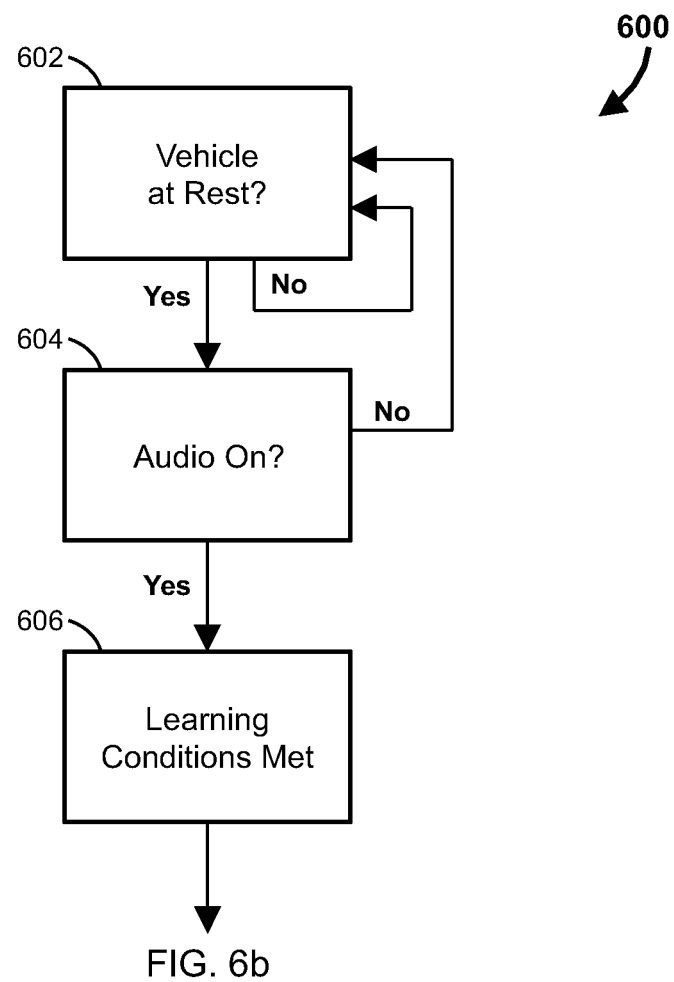

FILTRATION OF ACOUSTIC CONTAMINATE FROM VEHICLE SAFETY SENSORS

RELATED APPLICATIONS

This application relates to U.S. patent application Ser. No. 14/992,854 to Jensen et al. ("Jensen"), filed on Jan. 11, 2016, which is hereby incorporated by reference in its entirety.

TECHNICAL FIELD

This disclosure relates to decontamination of signals or data produced by vehicle sensors.

BACKGROUND

Vehicles include crash sensors that detect a vehicle crash or collision. Vehicles apply the crash sensors to improve crash or collision outcomes. For example, many vehicles cut fuel supply to the engine upon detecting a crash or collision. Cutting the fuel supply to the engine reduces fire hazard associated with a crash or collision and thus improves the safety of vehicles.

In addition to crash sensors, vehicles include audio systems such as horns and audio speakers. The audio systems can be OEM (i.e., manufacturer installed) or aftermarket (e.g., installed at a shop unaffiliated with the manufacturer). The audio systems may induce vibrations that skew or contaminate the crash sensors. This skew or contamination may result in a false-positive crash or collision detection and thus cause the vehicle to incorrectly cut the fuel supply to the engine.

Besides being inconvenient, incorrectly cutting fuel supply to the engine can be dangerous. For example, drivers depend on reliable engine performance when executing turns. If an engine unexpectedly shuts down due to a cut fuel supply, drivers may become stranded in the middle of a turn. Additionally, cutting fuel supply to the engine may permanently damage the engine.

A solution is needed to improve the reliability of crash sensors and, more specifically, to account for skew or contamination of the crash sensors induced by both OEM and aftermarket audio systems.

SUMMARY

The present disclosure provides multiple embodiments of a solution. Some embodiments of the solution involve, among other things, receiving a signal from OEM and/or aftermarket audio systems indicating a generation of sound. Based on the received signal, the vehicle filters or adjusts data captured from the crash sensors to generate filtered or adjusted crash sensor data. The vehicle then determines whether to cut fuel supply to the engine (or execute other safety maneuvers) with reference to the filtered or adjusted crash sensor data.

Embodiments of the solution are self-learning, meaning that the embodiments continuously adapt the crash sensor filtering techniques with time. These embodiments advantageously enable the vehicle to filter aftermarket audio systems that have been installed without the manufacturer's knowledge.

BRIEF DESCRIPTION OF THE DRAWINGS

For a better understanding of the invention, reference may be made to embodiments shown in the following drawings.

The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

FIG. 5 illustrates details of the method of FIG. 4.
FIG. 6a is a first portion of a method
FIG. 6b is a second portion of the method of FIG. 6a.

DETAILED DESCRIPTION OF EXAMPLE EMBODIMENTS

Figure 1A:
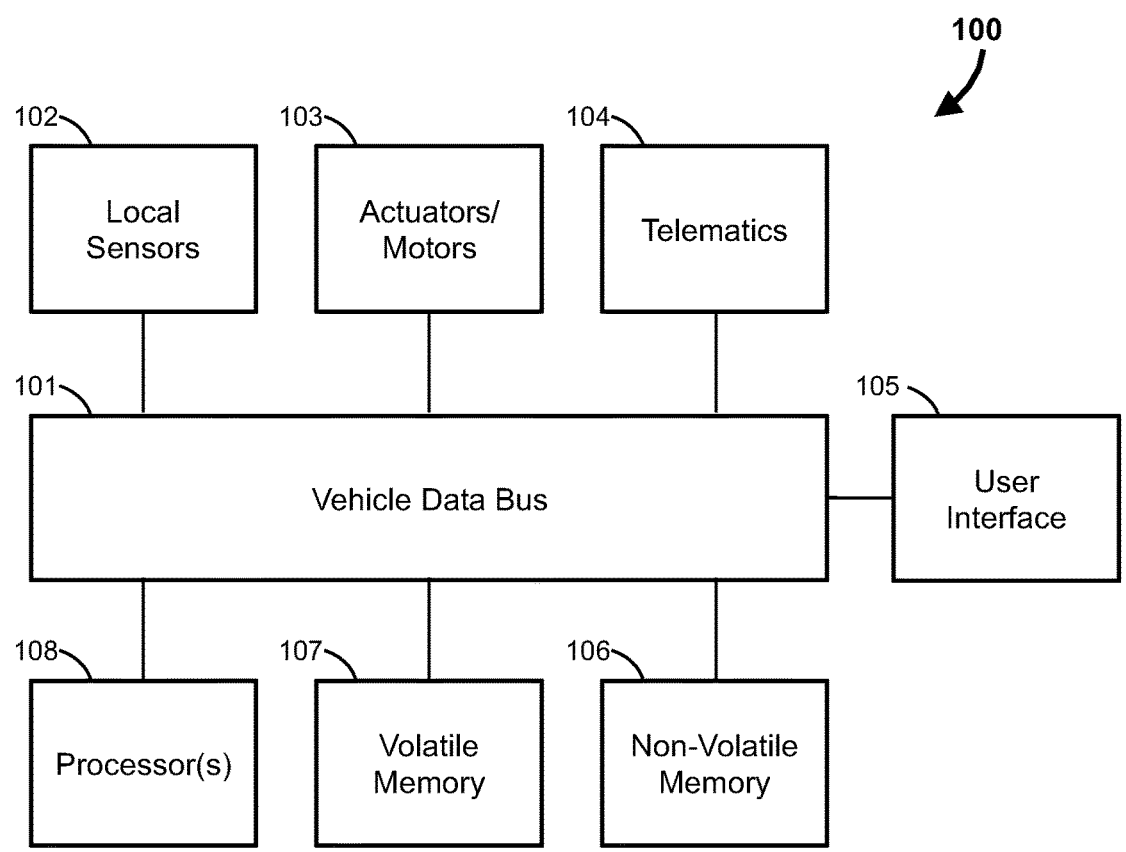
FIG. 1a is a block diagram of a computing system.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. The conjunction "or" may be used to convey features that are simultaneously present, as one option, and mutually exclusive alternatives as another option. In other words, the conjunction "or" should be understood to include "and/or" as one option and "either/or" as another option.

Figure 1B:
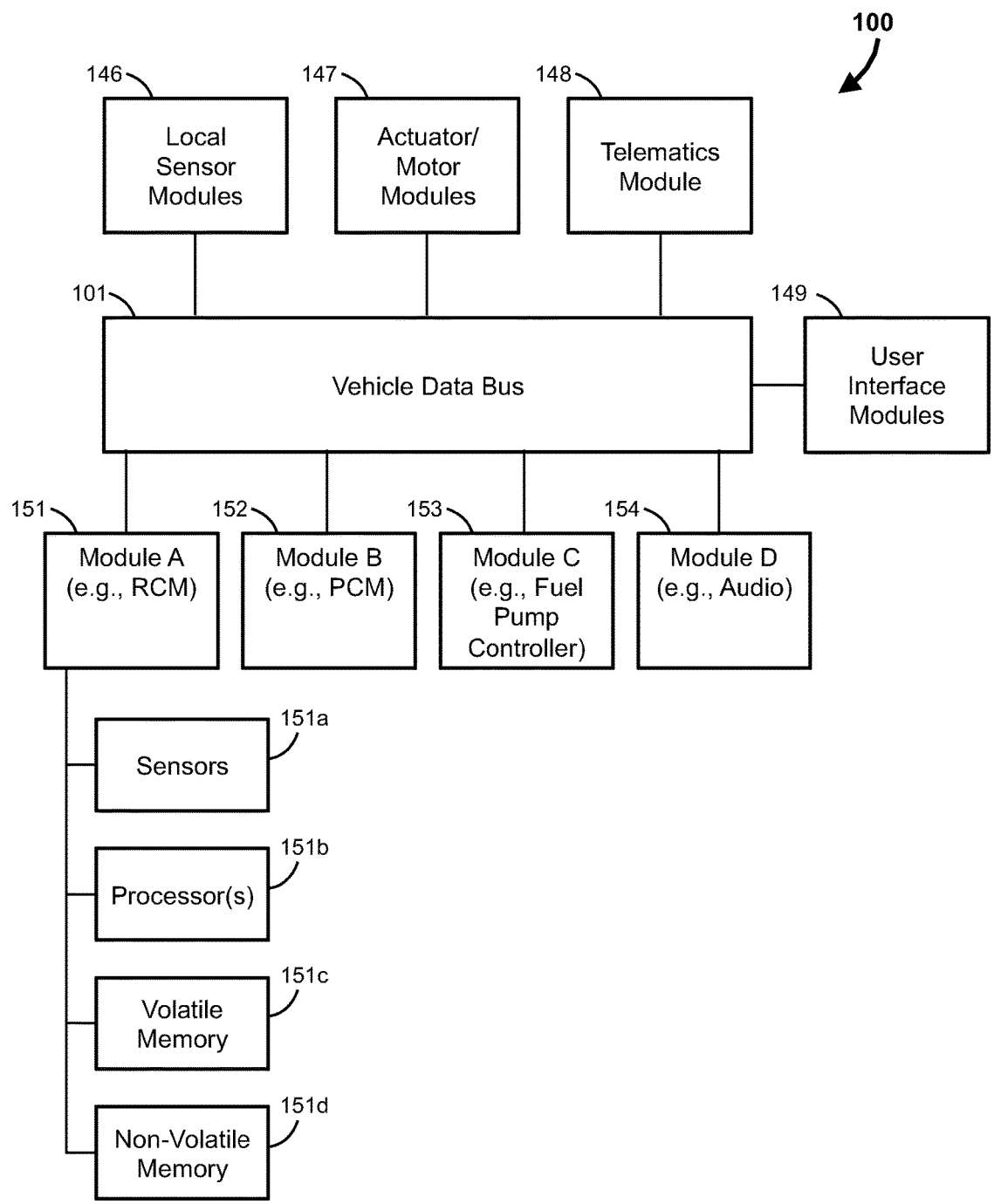
FIG. 1b is a block diagram of an embodiment of the computing system.

FIG. 1a shows a general block-diagram of a computing system 100 of a vehicle 200. FIG. 1b (discussed below) shows a possible more-specific arrangement of the computing system 100 shown in FIG. 1a.

The computing system 100 enables automatic control of mechanical systems within the device. The computing system 100 enables communication with external devices. The computing system 100 includes a data bus 101, one or more processors 108, volatile memory 107, non-volatile memory 106, user interfaces 105, a telematics unit 104, actuators and motors 103, and local sensors 102.

The data bus 101 traffics electronic signals or data between the electronic components. The processors 108 perform operations on the electronic signals or data to produce modified electronic signals or data. The volatile memory 107 stores data for immediate recall by the processor 108. The non-volatile memory 106 stores data for recall to the volatile memory 107 and/or the processor 108. The non-volatile memory 106 includes a range of non-volatile memories including hard drives, SSDs, DVDs, Blu-Ray Discs, etc. The user interface 105 includes displays, touch-screen displays, keyboards, buttons, and other devices that enable user interaction with the computing system. The telematics unit 104 enables both wired and wireless communication with external processors via Bluetooth, cellular data (e.g., 3G, LTE), USB, DSRC, etc. The telematics unit 104 may be configured to broadcast signals at a certain frequency.

The actuators/motors 103 produce physical results. Examples of actuators/motors include fuel pumps, fuel injectors, windshield wipers, brake light circuits, transmissions, airbags, engines, power train motors, steering, etc. The local sensors 102 transmit analog or digital readings or measurements to the processor(s) 108. Examples of local sensors include temperature sensors, rotation sensors, seatbelt sensors, crash sensors, accelerometers, speed sensors, cameras, lidar sensors, radar sensors, etc. It should be appreciated that the various connected components of FIG. 1*a* may include separate or dedicated processors, memory, and sensors as discussed with reference to FIG. 1*b*. In other words, each of the various connected components of FIG. 1*a* may be separate modules.

FIG. 1*b* is a block diagram of a more specific arrangement of the computing system 100. In other words, FIG. 1*b* shows one possible arrangement of the computing system 100 disclosed in FIG. 1*a*.

With reference to FIG. 1*b*, the computing system 100 includes local sensor modules 146, actuator/motor modules 147, one or more telematics modules 148, user interface modules 149, module A, module B, module C, and module D. The computing system 100 includes a range of additional modules (not shown). The modules are connected via one or more data busses 101. It should be appreciated that some modules may be directly connected via the data bus 101, while other modules may be indirectly connected via the data bus 101 (e.g., module A connects to some of the actuator/motor modules via module B).

Each of the modules may include dedicated sensors, processor(s), volatile memory, non-volatile memory, and other features (e.g., antennas, actuators, etc.) For example, module A includes dedicated sensors 151*a*, dedicated processor(s) 151*b*, dedicated volatile memory 151*c*, and dedicated non-volatile memory 151*d*. The same concept may apply to some or all of the other modules.

The local sensor modules 146 may include some or all of the local sensors 102. The actuator/motor modules 147 may include some or all of the actuators/motors 103. The telematics modules 148 may include some or all of the telematics 104. The user interface modules 149 may include some or all of the user interfaces 105. As stated above, each of these modules may include dedicated processor(s), dedicated volatile memory, dedicated non-volatile memory, and dedicated sensors. For the purposes of this disclosure, the term local sensors may encompass all sensors mounted on or housed within the vehicle 200, including sensors dedicated to a specific module (e.g., sensors 151*a* of module A).

Module A may be a restraint control module (RCM) 151. Module B may be a powertrain control module (PCM) 152. Module C may be a fuel pump controller 153. Module D may be an audio controller 154 (OEM and/or aftermarket).

Figure 2:
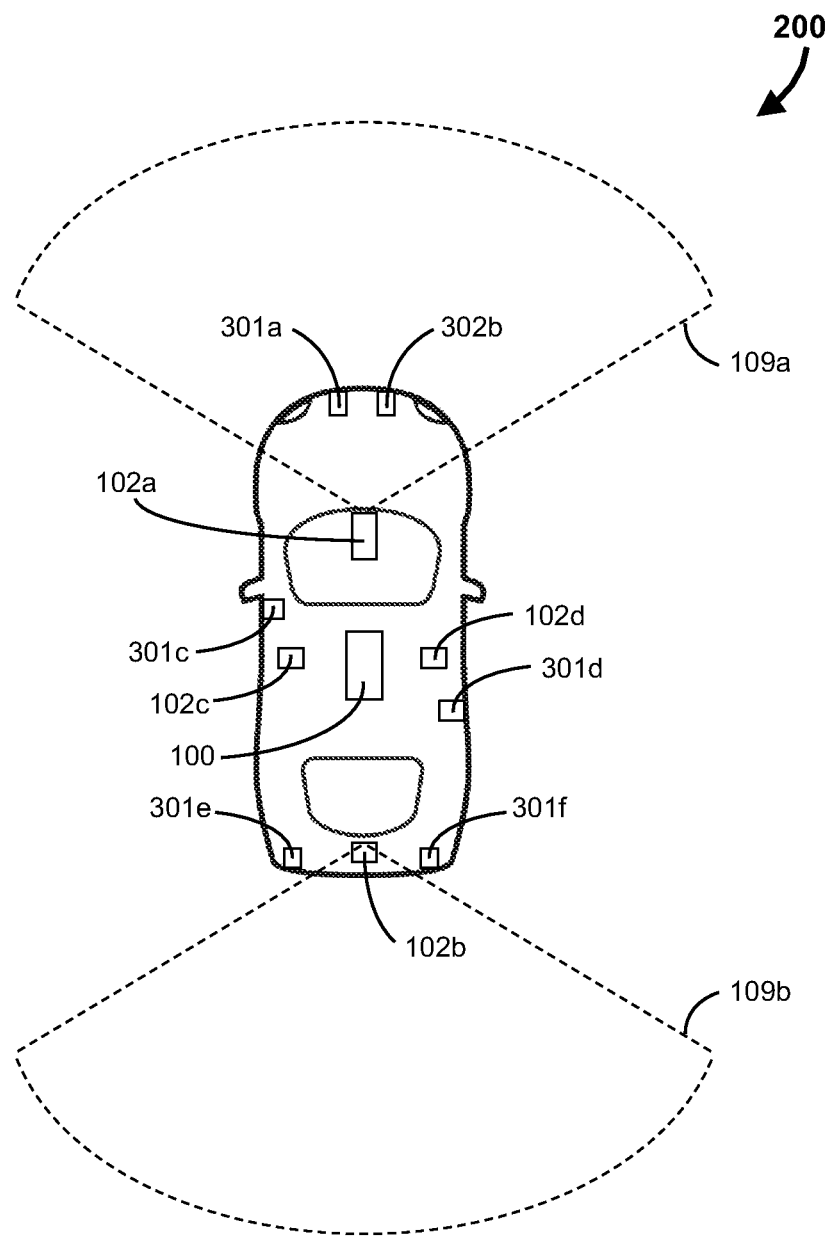
FIG. 2 shows a vehicle that includes the computing system.

FIG. 2 shows the vehicle 200. Vehicles are described, for example, in U.S. patent application Ser. No. 14/991,496 to Miller et al. ("Miller"), U.S. Pat. No. 8,180,547 to Prasad et al. ("Prasad"), U.S. patent application Ser. No. 15/186,850 to Lavoie et. al. ("Lavoie") and U.S. patent application Ser. No. 14/972,761 to Hu et al. ("Hu"), all of which are hereby incorporated by reference in their entireties. The vehicle 200 of the present disclosure may include some or all of the features described in Miller, Prasad, Lavoie, Jensen (incorporated by reference above), and/or Hu.

The vehicle 200 may include one or more of each of the following: the computing system 100, engines, motors, batteries, doors, seats, wheels, tires, frames, panels, dashboards, airbags, fuel tanks, brakes, battery chargers, exhaust systems, fuel pumps, fuel injectors, etc. Although not shown, the vehicle 200 may be in operative wireless communication with a one or more external computing devices, such as mobile phones and servers.

The vehicle may be a conventional combustion-powered vehicle (i.e., energy is supplied via combustion of fuel such as gasoline or diesel at the engine(s)), a conventional hybrid vehicle (i.e., energy is supplied via combustion at the engine(s) and/or electrical shore power and some of the drive energy is recovered at a hybrid battery), or a conventional electric vehicle (i.e., energy is supplied via electrical shore power and some of the drive energy may be recovered at a battery). Although not shown, the vehicle may be an aircraft such as an airplane or a helicopter, a boat or ship, or an industrial machine (e.g., a tractor).

Some of the local sensors 102 are mounted on the exterior of the vehicle 200. Local sensor 102*a* may be an ultrasonic sensor, a lidar sensor, a camera, a video camera, and/or a microphone, etc. Local sensor 102*a* may be configured to detect objects leading the vehicle 200. Local sensor 102*b* may be an ultrasonic sensor, a lidar sensor, a camera, a video camera, and/or a microphone, etc. Local sensor 102*b* may be configured to detect objects trailing the vehicle 200 as indicated by trailing sensing range 109*b*. Left sensor 102*c* and right sensor 102*d* may be configured to perform the same functions for the left and right sides of the vehicle 200.

The vehicle 200 includes a host of other sensors 102 located in the vehicle interior or on the vehicle exterior. For example, the vehicle 200 includes a plurality of crash sensors 301. The vehicle includes a front left crash sensor 301*a*, a front right crash sensor 301*b*, a left crash sensor 301*c*, a right crash sensor 301*d*, a rear left crash sensor 301*e*, and a rear right crash sensor 301*f*. Each of the crash sensors 301 includes an accelerometer. As is known in the art, the accelerometers may apply the piezoelectric effect to output a voltage signal that is proportional to acceleration.

It should be appreciated that the vehicle 200 is configured to perform the methods and operations described below. In some cases, the vehicle 200 is configured to perform these functions via computer programs stored on the volatile and/or non-volatile memories of the computing system 100. Among other things, a processor is "configured to" perform a disclosed operation when the processor is in operative communication with memory storing a software program with code or instructions embodying the disclosed operation. Further description of how the processor, memories, and programs cooperate appears in Prasad. It should be appreciated that the external device in operative communication with the vehicle 200 perform some or all of the methods and operations discussed below.

Figure 3:
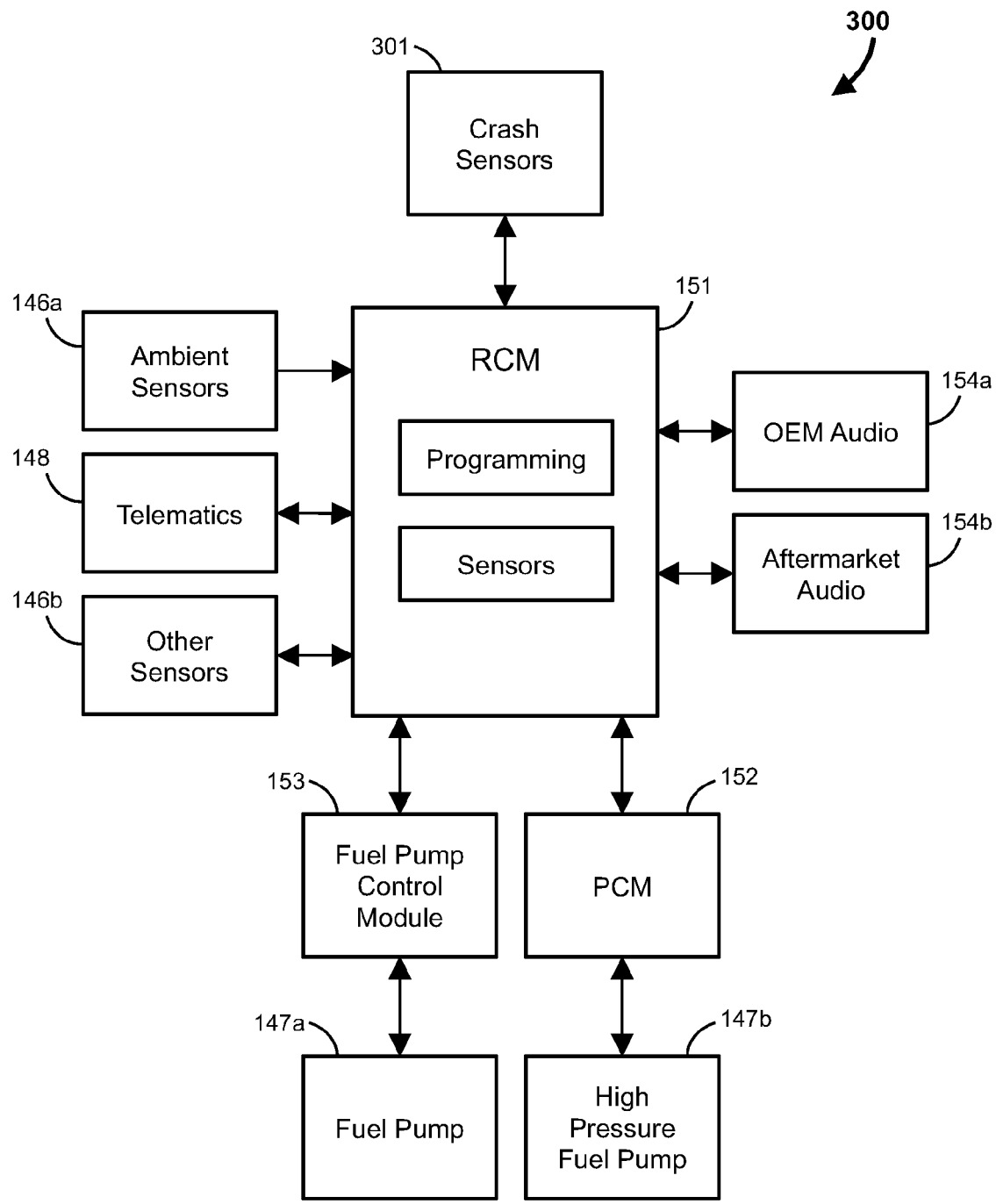
FIG. 3 is a block diagram of a portion of the computing system.

FIG. 3 is a block diagram of a portion 300 of the vehicle computing system 100. The restraint control module (RCM) is in bidirectional communication and/or unidirectional communication with the crash sensors 301, an OEM audio module 154*a*, an aftermarket audio module 154*b*, local ambient sensors 146*a*, other local sensors 146*b* (including any of the local sensors 102 previously described), the telematics module 148, the fuel pump control module 153, and the powertrain control module (PCM) 152. The RCM may be in further bidirectional or unidirectional communication with other safety modules (e.g., airbag deployment module or a battery or motor shut-off module). The vehicle data bus 101 facilitates this communication.

The fuel pump control module 153 regulates operation of a fuel pump 147*a* that supplies liquid fuel from a fuel tank of the vehicle 200 to the engine of the vehicle 200. The fuel pump 147a may be housed within the fuel tank. The engine includes a high pressure fuel pump 147b, which applies additional pressure to fuel received from the fuel pump 147a. The PCM 152 regulates operation of the high pressure fuel pump 147b. The high pressure fuel pump 147b is a specialized component, which is installed on unique vehicles (e.g., race cars).

FIGS. 4, 5, 6a, and 6b are block diagrams of methods and operations performed on the vehicle 200. As explained above, the methods and operations are stored on memory (e.g., memory of one or more of the modules) and executed on one or more processors (e.g., the processors of one or more of the modules). Some of the methods and operations may be segmented across modules. In those cases, the modules may only store their respective portions of the methods.

Figure 4:
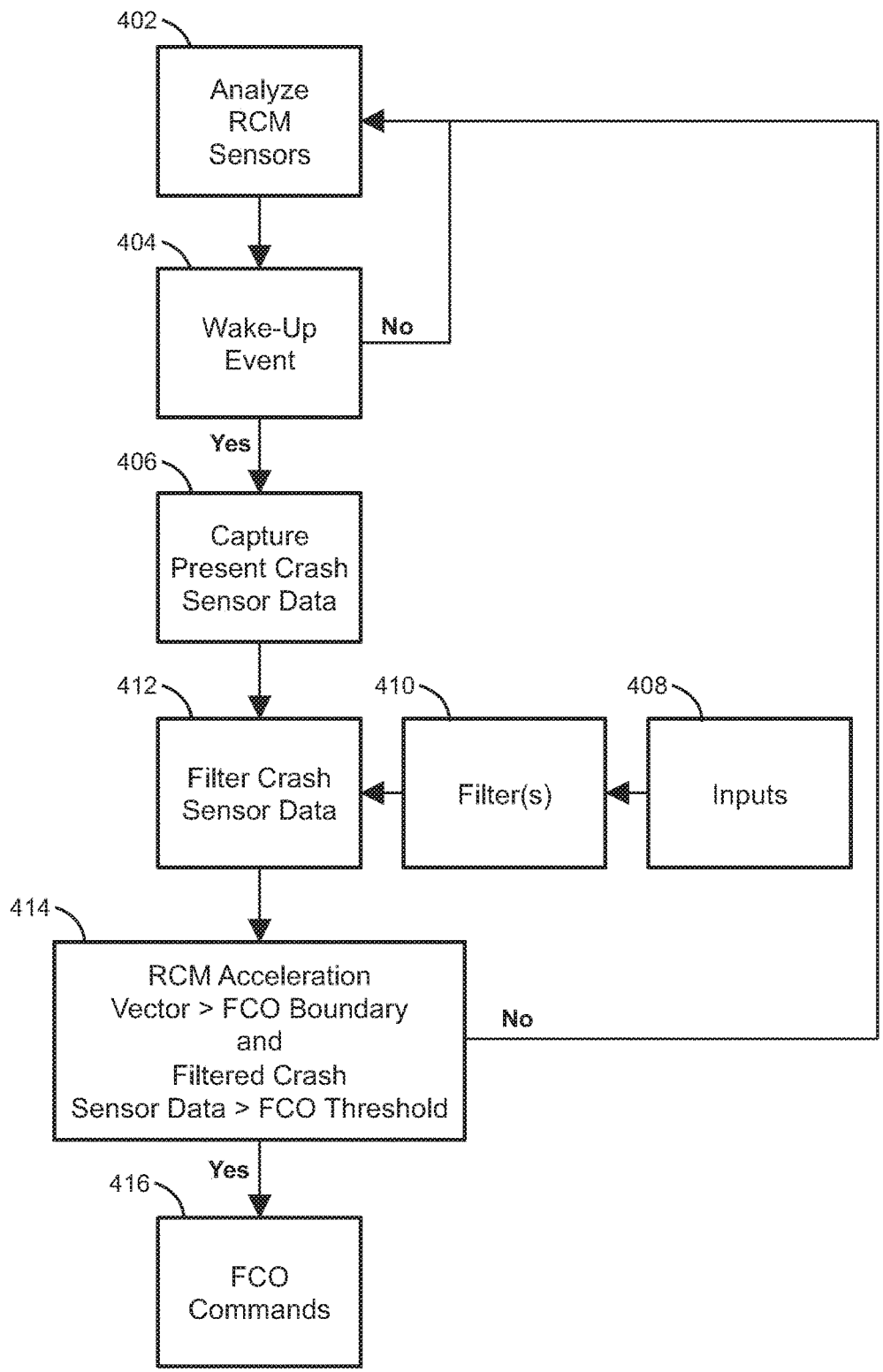
FIG. 4 is a block diagram of a method.

FIG. 4 is a block diagram of a method of cutting off fuel 400. The method generally includes (a) capturing present crash sensor data from the crash sensors 301, (b) filtering the captured present crash sensor data, and (c) applying the filtered crash sensor data to detect or determine a crash event.

The present application refers to various types of crash sensor data. For the purposes of clarity, some of the various types of crash sensor data are as follows: (i) Present crash sensor data is crash sensor data that is recorded during a possible collision event and when the vehicle is in motion. (ii) Filtered or decontaminated crash sensor data is present crash sensor data that has been filtered. As discussed below, the filter generally subtracts out contaminate from the present crash sensor data. According to some embodiments: filtered crash sensor data=(present crash sensor data)—(contaminate crash sensor data). (iii) Contaminate crash sensor data is crash sensor data captured during a self-learning process. Contaminate crash sensor data represents data reported by the crash sensors when no crash event has occurred.

Figure 7:
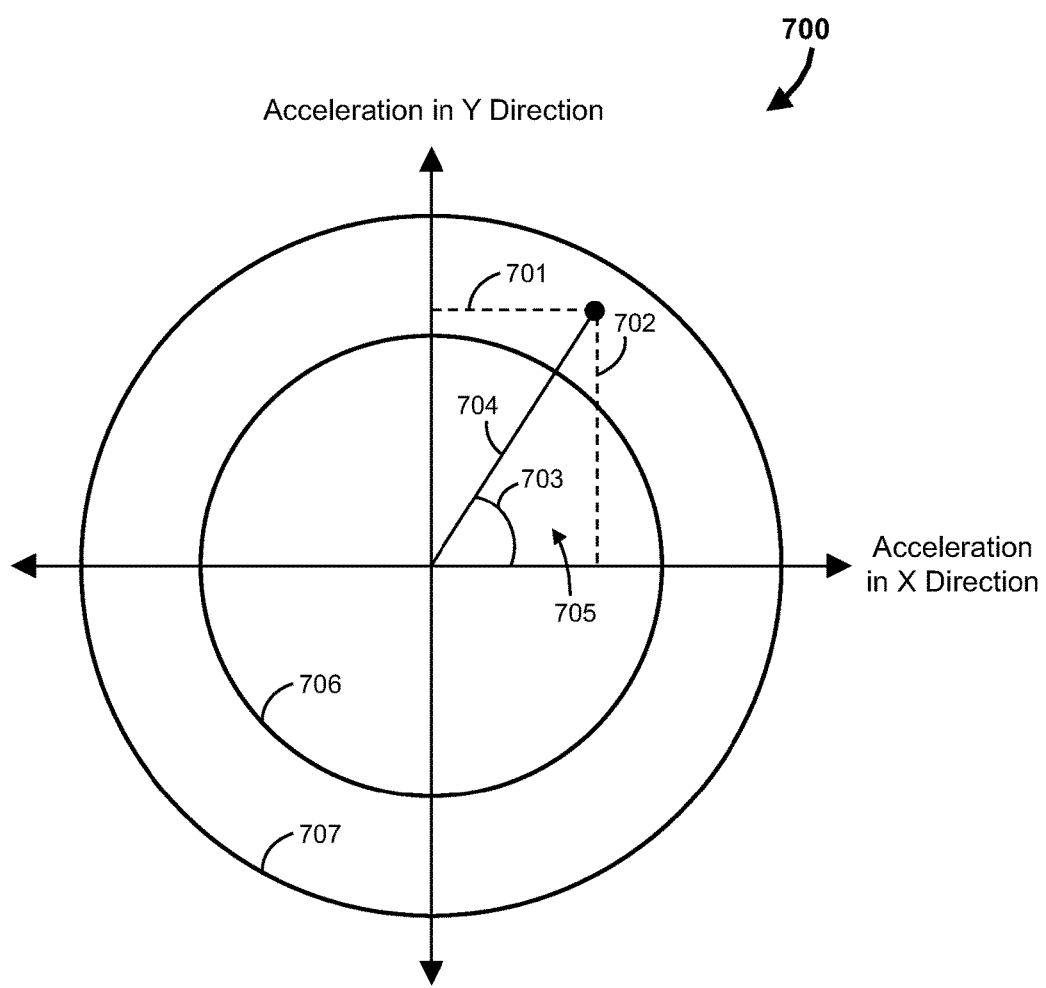
FIG. 7 illustrates a comparison of an acceleration vector with boundaries.

At block 402, the RCM 151 continuously analyzes the RCM local sensors 151a to build a net acceleration vector 705 (shown in FIG. 7). The RCM local sensors 151a measure acceleration events in the X direction (i.e., parallel to ground and parallel to a longitudinal major axis of the vehicle) and acceleration events in the Y direction (i.e., parallel to the ground and perpendicular to the longitudinal major axis of the vehicle).

With reference to FIG. 7, the RCM finds the net acceleration vector 705 based on the acceleration in the X and Y directions according to the following formula: magnitude of net acceleration $704=[(\text{acceleration in the X direction } 701)^2+(\text{acceleration in the Y direction } 702)^2]^{1/2}$. The RCM further determines an angle of the net acceleration 703 according to the following formula: (angle of the net acceleration $703)=\cos^{-1}$ [(acceleration in the X direction 701)/(magnitude of net acceleration 704)]. The net accelerator vector 705 is a segment extending from the center of the graph at the angle of the net acceleration 703 for a length equal to the magnitude of net acceleration 704.

FIG. 7 shows two predetermined boundaries: a wake-up boundary 706 and a fuel cut-off boundary 707. The boundaries 706, 707 may be circular and centered about the zero point of the graph 700. According to preferred embodiments, the boundaries 706, 707 are ovals or ellipses with a major axis along the X axis and a minor axis along the Y axis. The boundaries 706, 707 are manufacturer specified and preset.

With reference to FIGS. 4 and 7, at step 402, the RCM compares the net acceleration vector 705 to the wake-up boundary 706. If the net acceleration vector 705 crosses the wake-up boundary 706, then the RCM proceeds to block 406. If the net acceleration vector 705 is confined within the wake-up boundary 706, then the RCM restarts the method 400 at block 402.

During normal operation (i.e., when none of the self-learning algorithms discussed below are being applied), the RCM ignores data reported by the crash sensors 301. Crossing the wake-up boundary 706 at block 404 causes the RCM to pay attention to or actively capture and record data reported by the crash sensors 301.

Thus, at block 406, the RCM captures present crash sensor data from the crash sensors 301. At block 408, the RCM captures or receives inputs (discussed below). At block 410, the RCM selects one or more filters based on the captured or loaded inputs. As discussed below, the one or more filters generally enable the RCM to subtract out or filter out selected contaminate crash sensor data from the present crash sensor data. The one or more filters are thus selected to most accurately subtract out or filter out the selected contaminate crash sensor data.

At block 412, the RCM filters the present crash sensor data with the one or more filters. At block 414, the RCM determines whether to perform a fuel cutoff. First, the RCM compares the net acceleration vector 705 to the fuel cut off (FCO) boundary 707 (the RCM may have updated the net acceleration vector 705 based on new acceleration data in the interim). If the net acceleration vector 705 does not cross the FCO boundary 707 (i.e., is confined within the FCO boundary 707), then the method 400 restarts at block 402. If the net acceleration vector 705 does cross the FCO boundary 707, then the RCM compares the filtered crash sensor data to one or more fuel cut off (FCO) thresholds (discussed below). If the filtered crash sensor data falls inside of the one or more FCO thresholds, then the RCM restarts the method 400 at block 402.

If the filtered crash sensor data falls outside of or exceeds the one or more FCO thresholds, then the RCM sends a fuel cut off (FCO) command to the fuel pump control module 153 and the PCM 152 at block 416. In response to the FCO command, the pump control module 153 deactivates the fuel pump 147a, which prevents fuel from traveling from the fuel tank to the engine. In response to the FCO command, the PCM 152 deactivates the high pressure fuel pump 147b, which prevents fuel from being injected into the engine. Other modules or components may also actuate in response to the FCO command. For example, airbags may deploy, the vehicle 200 may broadcast a distress signal, and/or the vehicle may instruct the batteries to end current supply or reduce current supply.

FIG. 5 describes blocks 406, 408, 410, 412, and 414 of FIG. 4 in greater detail. Block 502 of FIG. 5 illustrates an example of present crash sensor data captured at block 406 of FIG. 4. This present crash sensor data has been contaminated by an audio system such as a horn or loud speakers. The X axis of the data is time. The Y axis of the data is acceleration.

With reference to block 502, the present crash sensor data captured from the crash sensor at block 406 exceeds the FCO threshold. More specifically, the signal has fallen outside of the range defined between upper boundary A and lower boundary B (one embodiment of the FCO threshold can thus be thought of as the range defined between upper boundary A and lower boundary B). It should be appreciated that this FCO threshold is purely exemplary and in practice, other kinds of FCO thresholds may be applied. For example, the FCO threshold, instead of being a range of values between upper and lower boundaries, may be a root-mean-squared value.

With reference to FIGS. 4 and 5, at blocks 408 and 410, the RCM measures inputs and then selects the one or more filters based on the inputs. As discussed below, the inputs generally include a set of conditions and an activity set. At block 412, the RCM filters the present crash sensor data to remove the contaminate and produce filtered or decontaminated crash sensor data.

Block 504 of FIG. 5 represents filtered or decontaminated crash sensor data. The data has been filtered or decontaminated by the one or more filters of block 412. Block 504 of FIG. 5 corresponds to the output of block 412 of FIG. 4.

With reference to FIG. 5, the filtered crash sensor data no longer falls outside of the range defined between the upper boundary A and the lower boundary B. The filtered crash sensor data thus does not exceed the FCO threshold. As a result, with reference to FIG. 4, the vehicle would return to block 402 from block 414 because the filtered crash sensor data would not exceed the FCO threshold.

Figure 6B:
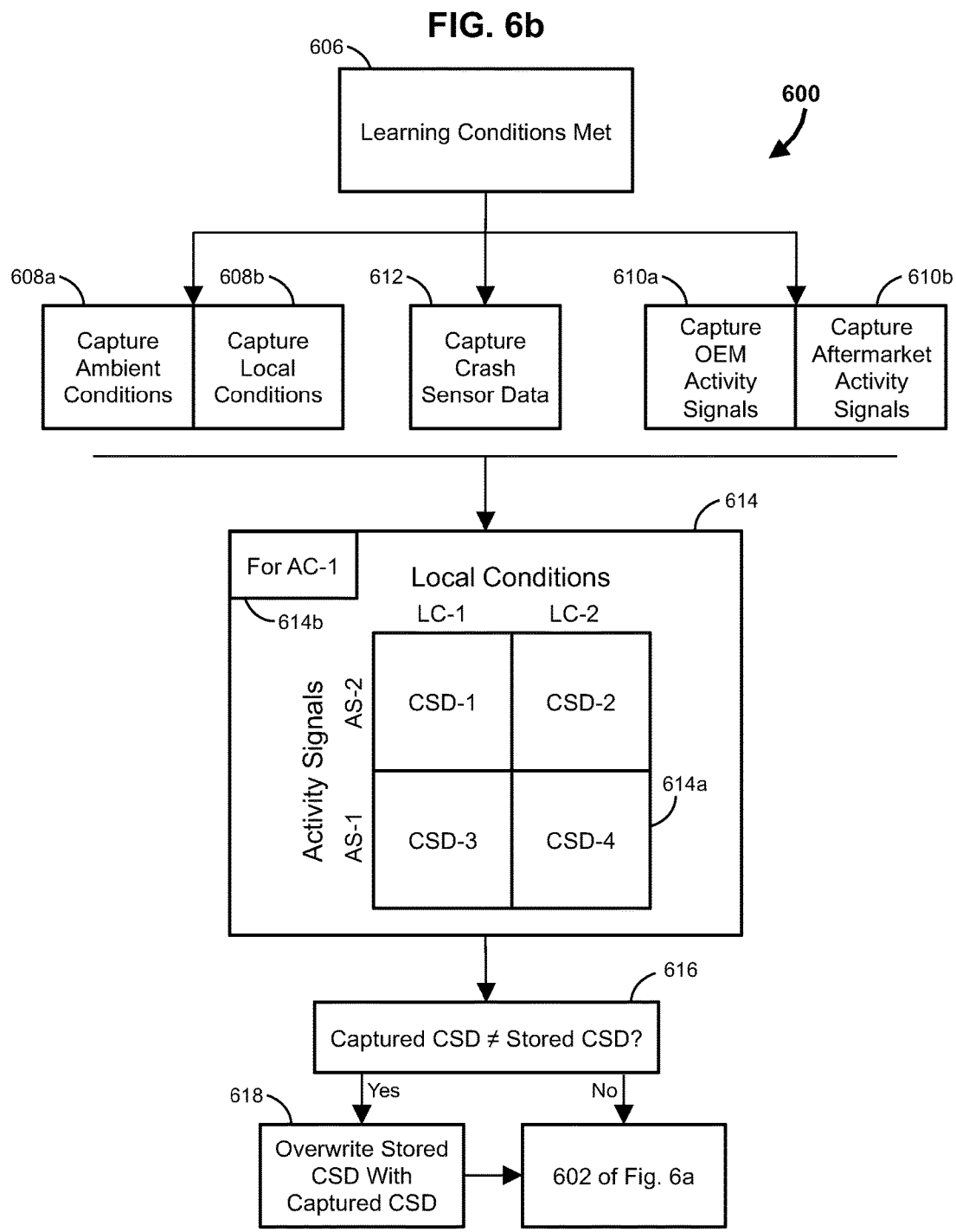

FIGS. 6a and 6b show a method 600 of associating contaminate crash sensor data with inputs. As stated above, the one or more filters remove the contaminate crash sensor data from the present crash sensor data. The RCM thus selects the one or more filters based on the contaminate crash sensor data that should be removed. Method 600 is thus a self-learning algorithm that enables the RCM to select the one or more filters based on newly recorded contaminate crash sensor data.

The method 600 generally includes (a) determining whether learning conditions are met, (b) measuring or recording various inputs, (c) measuring or recording contaminate crash sensor data, and (d) pairing the measured or recorded various inputs with the measured or recorded crash sensor data in a lookup table. During method 400 of FIG. 4, the RCM measures or records the present inputs (i.e., inputs that exist when the present crash sensor data is captured), references the lookup table to find the contaminated crash sensor data that corresponds to the present inputs, and then selects the one or more filters that best remove or subtract out the found contaminate crash sensor data from the present crash sensor data.

The following is an example: while in an idle condition (idle or park), the RCM identifies that the horn is on. The RCM captures contaminate crash sensor data from the time period when the horn is on. The RCM stores the contaminate crash sensor data in the lookup table that associates this particular contaminate crash sensor data with the horn being on. Later, after a wake-up event, the RCM identifies that the horn is on. The RCM also captures present crash sensor data. The present crash sensor data has been contaminated by the horn.

The RCM references the lookup table to locate the contaminate crash sensor data associated with the horn being on. Using this contaminate crash sensor data, the RCM selects one or more filters that enable the RCM to subtract the contaminate crash sensor data from the present crash sensor data. The result of the subtraction is filtered crash sensor data. The RCM compares the filtered crash sensor data, as opposed to the present crash sensor data, to the FCO threshold.

Returning to FIG. 6a, at block 602 the RCM determines whether the vehicle is at rest. The vehicle is at rest during park and during an idle condition (e.g., when idling at a stoplight). When the vehicle is at rest, the RCM determines whether an audio system is on. More specifically, and with reference to FIG. 3, the RCM receives an activity signal from the OEM audio module 154a and/or the aftermarket audio module 154b indicating whether audio is currently being generated. The audio may be a horn or may be speakers. The activity signal may be binary (i.e., on or off) or may be variable in magnitude (e.g., volume level 1, 2, 3, etc.). If an activity signal is present, the RCM determines that learning conditions are present at block 606. As with all disclosed features, it should be appreciated that the learning conditions of FIG. 6a are purely illustrative and may be replaced or omitted (discussed below).

Turning to FIG. 6b, the RCM captures or records inputs at blocks 608 and 610. The RCM associates the contaminate crash sensor data with the recorded inputs. At a later time, the RCM captures or records the kinds of same inputs and identifies the contaminate crash sensor data to be filtered out based on the captured or recorded inputs.

The RCM records or captures a set of conditions at block 608, including ambient conditions at block 608a and local conditions at block 608b. Ambient conditions are received via local sensors such as moisture sensors or over the Internet and include kind of weather (snow, rain, sunshine, etc.), magnitude of weather (e.g., light rain vs. heavy rain), temperature, humidity, time of day, location, friction coefficient of road surface (e.g., rough smooth) etc. Local conditions are received via local vehicle sensors 102 and relate to a condition or property of the vehicle including speed, acceleration, torque supplied to the wheels, weight, gear, power generation technique (e.g., power generation via the engine vs. power generation via the hybrid battery), etc.

At block 610, the RCM records or captures an activity set including the activity signals from OEM audio modules at block 610a and aftermarket audio modules at block 610b. The RCM may receive these activity signals via the data bus as shown in FIG. 3. More specifically, the RCM extracts (or the audio modules deliver) the activity signals from the audio modules.

As previously discussed, each activity signal may be binary (e.g., horn is ON or horn is OFF) or may be variable (e.g., speakers are playing at volume level 1, 2, 3, etc.). The variable activity signals represent the current volume of the audio. For example, imagine that the aftermarket audio is playing track A. The user of the aftermarket audio has set the aftermarket audio at volume level 8. At time 1, the volume of track A is 7; at time 2, the volume of track A is 0; at time 3 the volume of track A is 4 (put differently, even though the audio is at level 8, the audio system will not always play track A at volume level 8). The RCM module may receive the actual volume of the track given the set volume level (e.g., 7 at time 1, 0 at time 2, and 4 at time 3) instead of the set level (e.g., 8). Alternatively, the RCM module may simply receive the user-set volume level (e.g., 8).

At block 612, the RCM records or captures contaminate crash sensor data from each of the crash sensors 301. Because the vehicle is at rest, the contaminate crash sensor data should be zeroed. Thus, deviation from zero indicates that the crash sensor has been contaminated by the OEM or aftermarket audio signals.

At block 614, the RCM associates the contaminate crash sensor data with the inputs. The pairing or associating is illustrated as being contained in a lookup table. For example, lookup table 614a associates a first activity set (AS-1) and a first local condition set (LC-1) third contaminate crash sensor data (CSD-3). The first activity set may be the OEM horn being active and all other audio modules being inactive. The second activity set may be the aftermarket audio module playing at volume level 3 while all other audio modules are inactive. The first local condition set may be a specific weight of the vehicle and a specific power generation technique (e.g., power only being supplied via the hybrid battery).

It should thus be appreciated that each activity set should include a value (possibly zero) for each of the audio modules. Further, each local condition set should include a value (possibly zero) for each of the local conditions.

With continued reference to block 614, the lookup table 614a corresponds to a first ambient condition set (AC-1) shown in block 614b. Different ambient condition sets may link to different lookup tables. For example, the first ambient condition set (AC-1) may link to lookup table 614a, while a second ambient condition set may link to a different lookup table.

As stated above, the first ambient condition set may include a specific kind of weather (snow, rain, sunshine, etc.), a specific magnitude of weather (e.g., light rain vs. heavy rain), a specific temperature, a specific humidity, a specific time of day, a specific location, and/or a specific friction coefficient of road surface (e.g., rough smooth) etc. Each ambient condition set should include a value (possibly zero) for each of the ambient conditions.

Because the various sets of information require a data point or value for each element of the sets, the amount of memory required to store contaminate crash sensor data exponentially increases with the number of elements present in the various sets. For example, when the ambient condition set includes three elements (e.g., a specific kind of weather, a specific magnitude of weather, and a specific temperature), three data points are required to locate the proper lookup table. If the ambient condition set were to include four elements, then the four data points would be required to locate the proper lookup table and the number of lookup tables stored in memory would exponentially increase.

Two solutions remedy this issue: First, the number of elements in each set may be reduced or paired down. For example, the RCM may be configured to only consider some of the above-described ambient conditions (e.g., only consider temperature and humidity and ignore weather, location, etc.). Second, the RCM may apply an estimation algorithm that interpolates or extrapolates likely crash sensor data based on a limited number of lookup tables.

For example, if the measured temperature is 81 degrees F., then the RCM could load lookup table associated with 80 degrees F. (i.e., approximate the element of temperature). Alternatively, the RCM could interpolate between lookup tables associated with 80 degrees F. and 85 degrees F.

As another example, if the activity signals indicate that the horn is off and the aftermarket audio system is playing at level 5, then the RCM could interpolate between (a) first crash sensor data associated with the horn being off and the aftermarket audio system playing at level 4 and (b) second crash sensor data associated with the horn being off and the aftermarket audio system playing at level 6.

It should further be appreciated that lookup tables are only one possible solution. The RCM may apply any suitable technique to associate contaminate crash sensor data with inputs (e.g., building best fit functions).

At block 616, the RCM locates the entry of the lookup table associated with the inputs of blocks 608 and 610. The RCM compares the contaminate crash sensor data (e.g., CSD-1) stored in the located entry with the most recent contaminate crash sensor data. If the new contaminate data and the located contaminate data match, then the RCM returns to block 602.

If the data are different, then the RCM may discard the old contaminate crash sensor data and replace the discarded contaminate crash sensor data with the newly measured contaminate crash sensor data at block 618. According to some embodiments, instead of replacing old contaminate crash sensor data with new contaminate crash sensor data, the RCM keeps a running average of contaminate crash sensor data over a predetermined time length and amends the running average to incorporate the new contaminate crash sensor data.

Returning to FIGS. 4 and 5, at block 408, the RCM receives present inputs. The present inputs, as stated above, are the same kinds of inputs that the RCM receives at blocks 608 and 610. At block 410, the RCM applies the received inputs to load the appropriate lookup table. The RCM selects stored contaminate crash sensor data (e.g., CSD-2) based on the received inputs.

With the stored crash sensor data (e.g., CSD-2), the RCM selects the one or more filters. The selected filter enables the RCM to filter out the contaminate crash sensor data (e.g., CSD-2) from the present crash sensor data captured at block 406. The output of block 412 is the decontaminated or filtered crash sensor data.

It should be appreciated that the methods of FIGS. 4, 5, and 6, apply to a single crash sensor. Vehicles typically include multiple crash sensors and thus the methods associated with FIGS. 4, 5, and 6, are be independently executed for each of the crash sensors.

With reference to FIG. 6a, it should be appreciated that the RCM may apply alternate learning conditions. For example, the RCM may conduct method 600 while the vehicle is in motion to learn how speed-induced vibrations influence contamination from the audio systems. It is important, however, that the RCM does not capture crash sensor data generated caused by an actual crash event (e.g., hitting a pothole) during method 600. As a result, one of the learning conditions may be a stable, smooth, and/or continuous vehicle acceleration (e.g., as measured by the RCM acceleration sensors 151a). According to these embodiments, vehicle velocity and/or vehicle acceleration could be included as elements in the local condition sets and thus be integrated into the lookup table process of block 614.

It should further be appreciated that the audio modules 154 are not limited to horns and speakers. According to some embodiments, sound or vibration inducing vehicle components (e.g., the engine or motor) may be considered audio modules. According to these embodiments, the RCM would include activity signals from the sound or vibration producing vehicle components in the inputs of blocks 408, 608, and 610 (i.e., would include activity signals from the sound or vibration producing vehicle components in the activity signal sets). For example, a vibration sensor, such as an accelerometer, mounted on the engine may transmit an activity signal to the RCM. The RCM could count the activity signal from the engine vibration sensor as an input from an engine audio module. The RCM would then store and retrieve contaminate crash sensor data based on the activity signal from the engine.

The above disclosure includes selecting filters that best subtract or filter out contaminate crash sensor data from present crash sensor data. The technique of selecting one or more filters to remove unwanted or contaminated data from measured data is known in the art.

Such techniques are described, for example, in Jensen (incorporated by reference above). They are further described, for example, in (1) "Noise canceling in audio signal with adaptive filter" by Nicolae and Romulus (University of Oradea, Volume 45, Number 6, 2004), (2) "New Methods for Adaptive Noise Suppression" by Arslan and Vishu (IEEE International Conference on Acoustics, Speech and Signal Processing, May 1995), and (3) "Noise Removal in Speech Processing Using Spectral Subtraction" by Karam, Khazaal, Aglan, and Cole (Journal of Signal and Information Processing, 2014, 5, 32-41, May 2014). All of these documents are hereby incorporated by reference in their entireties.

The invention claimed is:

1. A vehicle comprising:
an audio system, a crash sensor, a fuel pump, and a processor configured to:
select a filter based on a determined audio system state;
find an acceleration of the vehicle via accelerometers;
compare the found acceleration to an acceleration threshold;
decontaminate present crash sensor data via the filter based on a result of the comparison; and
determine whether to deactivate the fuel pump based on the decontaminated data.

2. The vehicle of claim 1, wherein the processor is configured to: map prior crash sensor data to prior determined audio system states.

3. The vehicle of claim 2, wherein the processor is configured to: select the filter by selecting some of the mapped prior crash sensor data.

4. The vehicle of claim 3, wherein the filter is configured to remove the selected prior crash sensor data from the present crash sensor data.

5. The vehicle of claim 2, wherein the vehicle is a hybrid vehicle with an engine and an electric motor and the processor is configured to:
determine running states of the engine and the electric motor;
select the filter based on the determined audio system state and the determined running states.

6. The vehicle of claim 5, wherein the processor is configured to: select the filter by selecting prior crash sensor data mapped to prior determined audio system states, a prior determined running state of the engine, and a prior determined running state of the electric motor.

7. The vehicle of claim 2, wherein the processor is configured to:
determine whether the vehicle is idling; and
only map the prior crash sensor data to the prior determined audio states when the prior crash sensor data was generated during a determined vehicle idle.

8. The vehicle of claim 1, wherein the determined audio system state is a determined activity level of the audio system, the audio system includes a horn or speakers, and the crash sensor is an accelerometer.

9. The vehicle of claim 1, comprising: a plurality of audio systems and wherein the processor is configured to:
select the filter based on determined states of each of the plurality of audio systems.

10. The vehicle of claim 9, wherein local sensors include a moisture sensor and the processor is configured to:
select the filter based on determined states of each of the plurality of audio systems and a sensed moisture level.

11. The vehicle of claim 1, wherein the processor is configured to: select the filter by interpolating between first prior crash sensor data mapped to a first determined audio system state and second prior crash sensor data mapped to a second determined audio system state.

* * * * *